United States Patent Office 3,521,850
Patented July 28, 1970

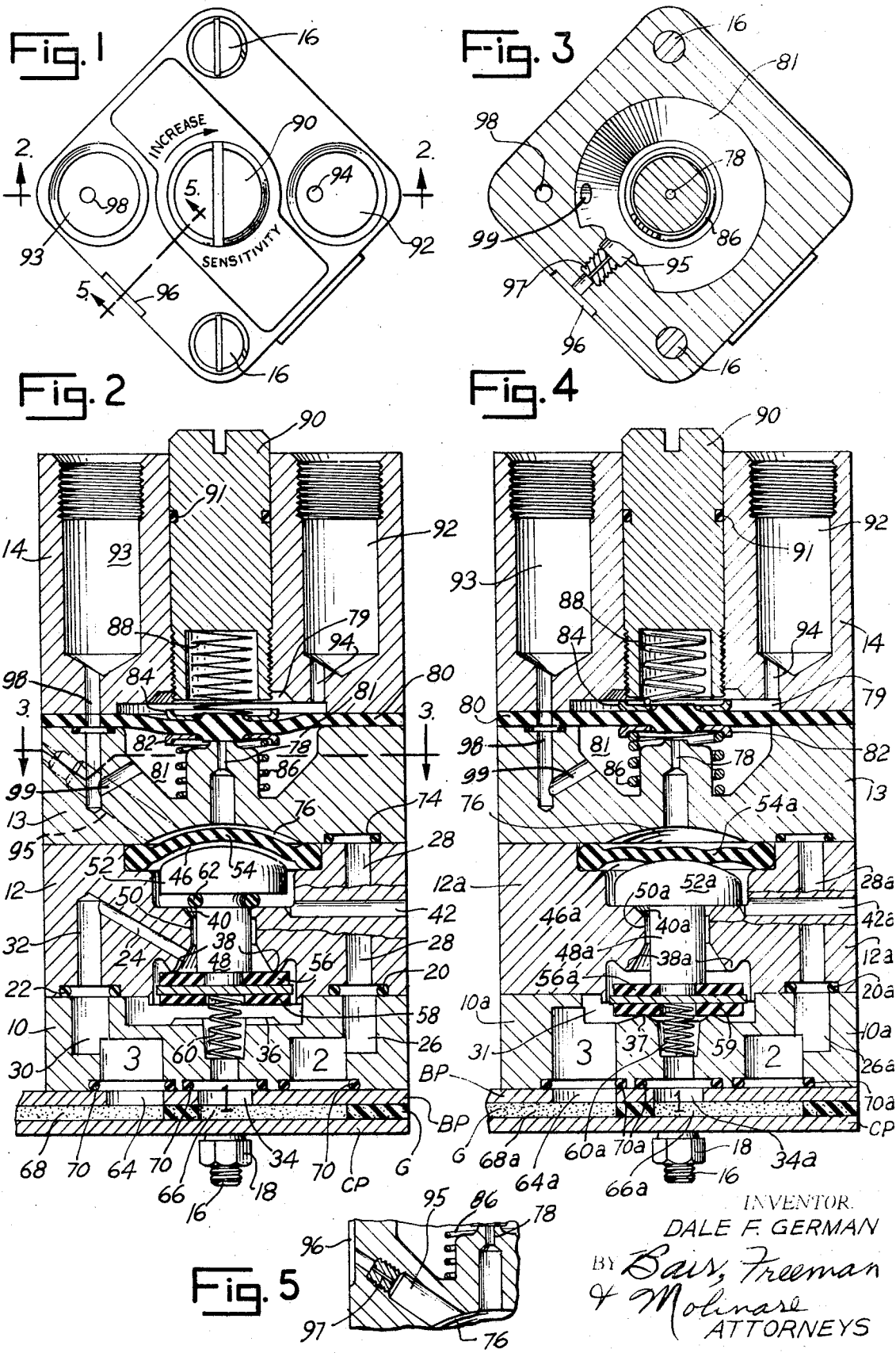

3,521,850
PRESSURE DIFFERENTIAL SENSOR VALVE ASSEMBLY
Dale F. German, Bryan, Ohio, assignor to Aro Corporation, Bryan, Ohio, a corporation of Delaware
Filed Mar. 29, 1968, Ser. No. 717,137
Int. Cl. F16k *11/02, 31/12*
U.S. Cl. 251—28  4 Claims

ABSTRACT OF THE DISCLOSURE

A pressure differential sensor valve assembly adapted to coact with a pressure actuated fluid logic valve or the like by utilizing differential pressures on opposite sides of a pilot control diaphragm to pneumatically control a pressure actuated element of the fluid logic valve. The pressure differential sensor valve assembly is controlled by first and second signal pressures on opposite sides of the pilot diaphragm which pneumatically controls the pressure responsive element of the fluid logic valve.

BACKGROUND AND SUMMARY OF THE INVENTION

One object of my present invention is to provide a pressure differential sensor valve assembly which acts as a conversion unit for converting a pressure actuated fluid logic valve, normally requiring a single signal pressure, to one which may be actuated differentially by two signal pressures on opposite sides of a pilot control diaphragm for the pressure responsive element of the fluid logic valve.

Another object is to provide a pressure differential sensor valve in the form of an assembly which can be substituted for a head on a fluid logic valve, and which is effective to convert the latter for operation by the feeding of a pair of signal pressures to the sensor valve assembly.

More specifically, an object is to provide a pressure differential sensor valve assembly which has a pilot diaphragm subject on one side to one pressure signal and on the other side to a second pressure signal, the diaphragm being balanced between the two pressure signals and operated by one signal increasing or decreasing a predetermined amount in relation to the other signal, thus providing two conditions:

(1) the pilot diaphragm pneumatically controlling the pressure responsive element of the pressure actuated fluid logic valve to relax it by greater flow of signal pressure from one source to the pilot diaphragm, thus closing it against a valve orifice leading to the pressure responsive element so that fluid pressure in its chamber may lead through another and smaller orifice to atmosphere to permit the valve controlled by the pressure responsive element to return to a normal position, and (2) depress the pressure responsive element by greater flow of signal pressure from the other source or less pressure from the one source, thus opening such valve orifice whereupon pressure from the other source depresses the pressure responsive element because of greater flow from the other source through the valve orifice than flow from the pressure responsive element chamber to atmosphere which positions the valve controlled by the pressure responsive element in non-normal position.

Still another object is to provide for adjusting the pressure signal value by the balancing of springs on opposite sides of the pilot diaphragm and an adjusting means for compressing the springs more or less as desired to change the trip pressure.

With these and other objects in view, my invention consists in the construction, arrangement and combination of the various parts of my pressure differential sensor valve assembly, whereby the objects above contemplated are attained, as hereinafter more fully set forth, pointed out in my claims and illustrated in detail on the accompany drawings wherein:

FIG. 1 is a plan view of a pressure differential sensor valve assembly embodying my invention;

FIG. 2 is a vertical sectional view on the line 2—2 thereof showing the sensor valve assembly mounted on an AND valve and in an exhaust position;

FIG. 3 is a sectional view on the line 3—3 of FIG. 2;

FIG. 4 is a sectional view similar to FIG. 2 showing my sensor valve assembly applied to a NOT valve and also in exhaust position; and FIG. 5 is a fragmentary detail sectional view on the line 5—5 of FIG. 1.

On the accompanying drawing I have used the reference characters BP to indicate a base plate G to indicate a gasket and CP to indicate a cover plate of a circuit board such as disclosed in the copending application of Brandenberg, Ser. No. 479,758, filed Aug. 16, 1965, now Pat. No. 3,407,833. The numerals 1 and 2 indicate inlet ports and 3 indicates an outlet port in FIGS. 2 and 4. FIG. 2 shows a fluid logic AND valve in the form of a unit such as disclosed in the copending Brandenberg application, Ser. No. 523,507 filed Jan. 25, 1966 now Pat. No. 3,385,322, and includes a valve body formed in two parts 10 and 12.

The parts 10 and 12 may be suitably secured together in leak proof manner by clamping them in face-to-face relationship by means of screws 16 passing first through two additional body parts 13 and 14, then through the part 12 and threaded through the part 10. The lower ends of the screws project so that the elements BP, G and CP can be mounted thereon as shown in FIG. 2 and held in position by nuts 18.

In order to seal fluid circuits between the parts 10 and 12, O-rings 20 and 22 are provided around passageways 26, 28, 30 and 32, which as shown in FIG. 2 when the heads of the screws 16 are properly tightened down against the part 14 by screwing the screws into the part 10.

The valve body part 10 includes the two inlet ports 1 and 2 and the outlet port 3 as illustrated, and the inlet port 1 terminates in a stop seat 36. The inlet port 2 and the passageway 26, 28 terminate at the lower surface of the body part 13 above a resilient diaphragm 54 of rubber, neoprene or the like and are "blind" when my pressure differential sensor valve assembly is applied to the AND valve as disclosed. The passageways 30 and 32 from the outlet 3 connect by means of a passageway 24 with an annular inlet valve seat 38 in the body part 12 and an opposing exhaust valve seat 40. The valve body part 12 also has an exhaust passageway 42 and is provided with a lower diaphragm chamber 46 for the diaphragm 54.

A valve stem 48 is slidable in a vertical bore 50 of the valve body part 12 and has a head 52 adapted to be engaged by the diaphragm 54 located in the lower diaphragm chamber 46 with its periphery sealed therein by the valve body part 13 mounted on the valve body part 12. The thickness of the diaphragm periphery is slightly greater than the vertical distance between the outer portion of the diaphragm chamber 46 and the lower surface of the body part 13 so that such periphery is normally under slight pressure to effect such seal. The lower end of the valve stem 48 carries an outlet disk 56 and a stop disk 58, and is normally biased upwardly by a light spring 60. The stem 48 is provided with an exhaust O-ring 62 immediately under the head 52. Thus, the outlet valve disk 56 is normally seated against the outlet valve seat 38 and the exhaust O-ring 62 is normally off the exhaust valve seat 40 when there is no pressure in the inlet port 1.

The inlet port 1 and the outlet port 3 terminate at the lower face of the valve body part 10 so that this face is adapted to be mounted on a fluid circuit board as illustrated (specifically against the upper surface of the base plate BP) and in alignment with certain passageways 34 and 64 which provide for circuit connections within the circuit board. In FIG. 2 the passageway 34 is illustrated as communicating with a high pressure supply passageway 66 and the passageway 64 communicates with an output passageway 68 whereby the AND valve thus far described may perform an AND function as disclosed in the copending application, Ser. No. 523,507, now Pat. No. 3,385,322.

By having the inlet port 1 and the outlet port 3 terminate at the lower face of the valve body part 10, fluid circuit connections of the type referred to are readily made and sealing can be effectively accomplished by the use of O-rings 70, it being merely necessary to have these O-rings surround the inlets and the outlet, and resiliently engage adjacent faces of the base plate BP and the valve body part 10 as shown. In the present disclosure, the inlet 2 is not used but is blocked at the upper end of the passageway 28 by the lower surface of the body part 13 and is sealed by an O-ring 74. The inlet 2 and the passageway, 26 and 28 are present only as standard details of the AND valve shown in FIG. 2.

The valve thus far described and disclosed in FIG. 2 normally performs an AND function, and is normally closed (the outlet 3 relative to the inlet 1) as illustrated. With the addition of my pressure differential sensor valve assembly however, a normally open or NOT type of operation is achieved as will hereinafter appear.

My pressure differential sensor valve assembly of the present invention comprises the body parts 13 and 14 and the mechanism contained therein, but before going into detail with respect thereto, attention is called to FIG. 4 wherein my valve assembly is applied to a fluid logic NOT valve such as disclosed in the copending application of Brandenberg, Ser. No. 561,143, filed June 28, 1966, now Pat. No. 3,389,720. Such a NOT valve includes body parts 10a and 12a together with the inlet ports 1 and 2, the outlet port 3 and quite a number of other parts comparable to FIG. 2 and bearing the same reference numerals with the addition of the distinguishing characteristic a.

Additionally, in place of the stop seat 36 of FIG. 2, a supply valve seat 37 is provided; and instead of a stop disk 58, a valve disk 59 is provided for coaction with the seat 37. The outlet port 3 communicates by way of a passageway 31 with the outlet side of the seat 37 and with the outer diameter of an annular outlet valve seat 38a, rather than through passageways 30, 32 and 24 with the inner diameter thereof as in the AND valve in FIG. 2.

The operation of the NOT valve just described is such that if the head 52a is up (instead of down as illustrated), supply pressure from the inlet 1 flows past the open valve seat 37 into the outlet port 3, thereby pressurizing whatever device is connected to the passageway 68a. At such time the outlet valve seat 38a would be closed as the disk 56a would be in contact therewith. This condition of operation is the reverse of that shown in FIG. 4.

On the other hand if the head 52a is down (as illustrated), the diaphragm 54a as shown in FIG. 4 forces the disk 56a off the seat 38a and the disk 59 against the seat 37 thereby cutting off the supply from passageway 66a and permitting any pressure in passageways 68a, 64a and 31 to be exhausted past the outlet valve seat 38a to the exhaust passageway 42a from which it discharges to atmosphere. The output is therefore OFF (discharged). The NOT valve disclosed in FIG. 4 normally performs a NOT function as fully disclosed in the copending application above referred to, Ser. No. 561,143, and is normally open (the outlet 3 relative to the inlet 1). With the addition of my pressure differential sensor valve assembly however, a normally closed or AND type of operation is achieved as will hereinafter appear. The reverse operations referred to relating to the AND valve of FIG. 2 and the NOT valve of FIG. 4 allow pressures to be applied by my valve assembly to both sides of the pilot diaphragm 80 from two signal sources in such manner that the diaphragm responds to a predetermined difference between those pressures.

Describing now the pressure differential sensor valve assembly constituting my present invention and shown in both FIGS. 2 and 4, a cavity 76 in the body part 13 forms an upper diaphragm chamber for the diaphragm 54 which has an exhaust passageway 95 to atmosphere (FIG. 5). A restrictive orifice bleed plug 97 is provided in the passageway 95 which lets pressure escape from the chamber 76 slower than it can enter the chamber through a valve orifice 78 to which the chamber 76 also leads. The body parts 13 and 14 have relief grooves 96 for such escape when another unit is mounted closely adjacent the one disclosed.

Spring cups 82 and 84 are positioned on the bottom and top of the diaphragm 80 adjacent the center thereof. A spring 86 is interposed between the spring cup 82 and the body part 13. An adjusting screw 90 is threaded in the body part 14, and a lighter spring 88 is interposed between the spring cup 84 and a socket in the adjusting screw 90, the screw being provided with an O-ring 91 for sealing purposes.

Differential pressure inlets 92 and 93 are provided in the body part 14 and communicate through passageways 94 and 98 with the top and bottom of the pilot diaphragm 80, the passageway 98 communicating with the chamber 81 through an additional passageway 99 while the passageway 94 communicates directly with the chamber 79.

There are many applications where it is desirable to feed differential signal pressures to pneumatic logic systems such as those shown in the Brandenberg applications. These signals may be obtained from such devices as air jet nozzles, pure fluid logic systems and pneumatic control valves.

PRACTICAL OPERATION

Referring to FIG. 2 with compressed air or other fluid under pressure connected to inlet port 1 entering from passageway 66 and passing through passageway 34, such pressure is blocked by the valve disk 56 against the inlet seat 38 from passing through passageways 24, 32 and 30 to outlet port 3. With the valve disk and the O-ring 62 in the position shown, there is an absence of pressure at outlet port 3 which is open to atmosphere through bore 50, seat 40 and passageway 42.

The differential pressure inlets 92 and 93 are connected to separate sources of signal pressures and operations of the fluid logic valves and my pressure differential sensor valve assembly are as follows:

(1) If the variable pressure varies by increasing, it is connected to inlet 92 (top of diaphragm). The control pressure is connected to the inlet 93 (bottom of diaphragm).

(2) If the variable pressure varies by decreasing, it is connected to the inlet 93 (bottom of diaphragm). The control pressure is connected to the inlet 92 (top of diaphragm).

Under normal conditions the pressures are equal on opposite sides of the diaphragm 80. The diaphragm is therefore raised from the valve orifice 78 as in FIG. 4 allowing pressure from inlet 93 (bottom of diaphragm) to flow through the orifice 78 and then (more slowly) through the bleed plug 97. The pressure therefore builds up in the chamber 76 and acts on diaphragm 54 causing it to provide an output (FIG. 2) or no output (FIG. 4).

When the net pressure increases on top of the diaphragm 80, the diaphragm is forced down sealing off the orifice 78 from the signal pressure inlet 93. This allows air acting upon the diaphragm 54 to continue to escape to atmosphere through the bleed plug 97 without replenishment, thereby allowing the valve head 52 or 52a to rise and the valve to seat at 38 or 38a. This provides no output (FIG. 2) or an output (FIG. 4). Whenever the variable pressure returns to normal, the pressures on opposite sides of the diaphragm 80 are again equalized and the diaphragm 80 is spaced from the orifice 78 as in FIG. 4, and all conditions return to the original state.

The springs 86 and 88 and the adjusting screw 90 determine the "sensitivity" of operation, or the amount of pressure variation which will actuate the valve. A set of springs 86 and 88 such as illustrated in FIG. 2 can provide a sensitivity range of ½ to 1½ p.s.i.g. while somewhat heavier springs as shown in FIG. 4 may provide a sensitivity range of 3 to 20 p.s.i.g.

The foregoing disclosure explains how the pressure differential sensor valve assembly of my present invention is applied to an AND valve of the type shown in FIG. 2 and similarly to a NOT valve of the type shown in FIG. 4, and how it coacts with the upper surface of the diaphragm 54 to actuate the same in response to differential signal pressures. Likewise, any other type of fluidic control valve having such a diaphragm can have my pressure differential sensor valve assembly applied thereto. As other examples, reference is here made to Brandenberg applications, Ser. No. 513,215 filed Dec. 13, 1965 now Pat. No. 3,403,693, for an OR valve, Ser. No. 563,746 now Pat. No. 3,385,323, for a MEMORY valve, Ser. No. 563,747 now Pat. No. 3,419,032 for a DIFFERENTIATOR valve and Ser. No. 563,744 now Pat. No. 3,466,004 for a TIMING valve, the latter three applications having been filed July 8, 1966.

The trip pressure for the pilot diaphragm 80 can be adjusted by rotating the adjusting screw 90. When it is turned so as to extend farther out of the body part 14, the spring 86 must be overcome by a signal pressure at inlet 92 to push the diaphragm 80 downward onto the seat at the valve orifice 78 with a greater differential of pressure with respect to the inlet 93. If it is desired to reduce the trip pressure, the adjustment screw is turned farther into the pilot valve body 14 and the spring 88 cancels some of the force being exerted by the spring 86. This in effect reduces the difference between the signal pressures to seat the diaphragm 80 on the valve orifice 78.

From the foregoing specification, it will be obvious that I have provided a pressure differential sensor valve assembly in the form of a unit which is adaptable for coaction with a fluid logic valve of the type having a pressure port and a valve actuating diaphragm, when my assembly is mounted on the body of the valve it is to control in place of the usual head provided on such valve body. Such valve bodies are disclosed in the copending Brandenberg applications above referred to and specifically the ones relating to the OR, AND, NOT, MEMORY, DIFFERENTIATOR and TIMING valves.

I claim as my invention:

1. A pressure differential sensor valve assembly for actuating a pressure actuated valve which has a pressure responsive element to actuate a valve mechanism thereof, said pressure responsive element being mounted in a valve body and exposed at one face of the body, said face of said element being enclosed by said pressure differential sensor valve assembly; said pressure differential sensor valve assembly comprising a sensor valve body to, said sensor valve body having a chamber communicating with said pressure responsive element, a pilot diaphragm in said sensor valve body, said pilot diaphragm being subject on one side to a first source of signal pressure and on the other side to a second source of signal pressure whereby it is differentially responsive to said sources of signal pressures, biasing means against said diaphragm for maintaining said diaphragm in a normally neutral position and subject to deflection at a predetermined differential trip pressure, an orifice opening from said chamber to one side of said pilot diaphragm, said pilot diaphragm being positioned to seat on said orifice whenever said signals acting on said pilot diaphragm differ to deflect said pilot diaphragm from the neutral position, and bleed orifice exhaust means from said chamber of smaller size than said orifice for exhausting said chamber at a slower rate than the rate at which pressure is supplied through said orifice to said chamber.

2. A pressure differential sensor valve assembly according to claim 1 wherein said biasing means is adjustable to modify the trip pressure value of the first and second signal pressures acting on opposite sides of said pilot diaphragm.

3. A pressure differential sensor valve assembly according to claim 1 wherein said biasing means comprises a pair of opposed springs exerting bias against opposite sides of said pilot diaphragm.

4. A pressure differential sensor valve assembly according to claim 1 wherein said biasing means is adjustable and comprises an adjusting screw threaded into said sensor valve body and operatively engaged with one end of said resilient means.

References Cited
UNITED STATES PATENTS

| | | | |
|---|---|---|---|
| 1,389,370 | 8/1921 | Metzger | 251—28 X |
| 2,523,826 | 9/1950 | Heinzelman | 251—28 X |
| 2,619,107 | 11/1952 | Graham | 251—28 X |
| 2,947,320 | 8/1960 | Oxley et al. | 251—367 X |
| 3,047,003 | 7/1962 | Gurney | 251—28 X |
| 3,176,954 | 4/1965 | Cameron et al. | 137—269 X |

ARNOLD ROSENTHAL, Primary Examiner

U.S. Cl. X.R.

137—271, 625.66; 251—61.1, 367